United States Patent
Bhat et al.

[11] Patent Number: 5,525,317
[45] Date of Patent: Jun. 11, 1996

[54] AMMONIA REAGENT APPLICATION FOR NOX SOX AND PARTICULATE EMISSION CONTROL

[75] Inventors: Pervaje A. Bhat, North Canton; Donald P. Tonn, Copley, both of Ohio

[73] Assignee: The Babcock & Wilcox Company, New Orleans, La.

[21] Appl. No.: 334,502

[22] Filed: Nov. 4, 1994

[51] Int. Cl.[6] .................................................. C01B 21/00
[52] U.S. Cl. .................. 423/235; 422/172; 422/177; 422/211; 422/214; 423/238; 423/239.1; 110/345
[58] Field of Search .................................... 422/170, 172, 422/177, 190, 211, 214, 217; 165/7; 502/439, 515, 527; 423/235, 237, 242.1, 239.1, 238; 110/345

[56] References Cited

U.S. PATENT DOCUMENTS

| | | | |
|---|---|---|---|
| 4,026,992 | 5/1977 | Shiga et al. | 423/239 |
| 4,640,825 | 2/1987 | Rosenberg | 423/235 |
| 4,748,012 | 5/1988 | Weber et al. | 423/239 |
| 4,880,378 | 11/1989 | Hums | 431/170 |
| 4,969,984 | 11/1990 | Kwamura et al. | 204/157.3 |
| 5,165,903 | 11/1992 | Hunt et al. | 423/239 |
| 5,237,939 | 8/1993 | Spokoyny et al. | 110/345 |
| 5,240,689 | 8/1993 | Jones | 423/235 |
| 5,300,270 | 4/1994 | Krigmont et al. | 423/239.1 |

Primary Examiner—Robert J. Warden
Assistant Examiner—N. Bhat
Attorney, Agent, or Firm—Daniel S. Kalka; Robert J. Edwards

[57] ABSTRACT

A flue gas emission control system for coal fired boilers use individual units for $NO_x$, $SO_x$ and particulate removal and provides ammonia injection to all three units from a single source.

14 Claims, 1 Drawing Sheet

AMMONIA REAGENT APPLICATION FOR NOX SOX AND PARTICULATE EMISSION CONTROL

BACKGROUND OF INVENTION

1. Field of the Invention

The present invention deals with $NO_x$, $SO_x$ and particulate removal systems for fossil fuel burning boilers in general and more particularly to such systems utilizing ammonia reagents therein.

2. Description of the Related Art

The by-products of combustion are stack gases, which are present with all fossil fuels, and ash, which is present in substantial quantity with coal and in lesser quantity with oil combustion.

Stack gases contain particulate matter as well as certain gaseous products of combustion which produce air pollution if discharged in sufficient quantity. Stack gases contain carbon monoxide and carbon particles. The problems with stack gases arise principally from fly ash and oxides of sulfur and nitrogen.

Stacks are used successfully for dispersing gases and suspended particulate matter over a large area. Their heights have increased as unit sizes have increased. Stacks as high as 1200 ft are used, particularly in narrow valleys where it is desired to disperse gases beyond surrounding hills.

While stacks are effective in dispersing gases, in locations where there is a concentration of industry the atmosphere can become overloaded with the discharge from many stacks during periods of air stagnation. The effect is particularly objectionable on damp, foggy days when a combination of smoke and fog-blankets the area. Thus, when the total discharge of pollutants reaches a certain amount, the stack alone may not constitute an adequate provision for the health and comfort of the community and hence particular equipment for removing particulates, nitrogen oxides ($NO_x$), and sulphur oxides ($SO_x$) are required.

The problems of particulate or ash removal and disposal are significant principally in the case of fuels such as coal. Electrostatic precipitators and other particulate collection devices have been used to remove such particulates from the stack.

Particulate removal is especially needed with pulverized-coal firing boilers since all the burning is accomplished in suspension with the result that about 80 to 90% of the ash remains in the flue gases.

To meet the objective of a clear stack, high efficiency particulate collection devices are now generally required to remove the fly ash from flue gases from units where fuels are burned in suspension. Electrostatic precipitators are the most widely used and preferred particulate collector.

Electrostatic precipitators produce an electric charge on the particles to be collected and then propel the charged particles by electrostatic forces to the collecting curtains. The precipitator operation involves four basic steps:

1. An intense, high voltage electrical field is maintained between the discharge electrode and the collecting curtains.
2. The carrier gases are ionized by the intense, electrical field. These gas ions, in turn, charge the entrained particles.
3. The negatively charged particles, still in the presence of an electrostatic field, are attracted to the positively (grounded) charged collecting curtains.
4. The collected dust is discharged by rapping into storage hoppers.

The collection efficiency of the electrostatic precipitator is related to the time of particle exposure to the electrostatic field, the strength of the field, and the resistivity of the dust particle. An efficiency in excess of 99% is obtained at a cost generally favorable in comparison with other types of equipment.

This technology has been advanced through flue gas conditioning for the marginally designed precipitators to meet the current low emission standards (0.03–0.1 lb/$10^6$ Btu) and to enhance particulate collection. Typically, sulfur trioxide ($SO_3$) and/or ammonia ($NH_3$) can be injected into the precipitator without extensive modification. Uniform $NH_3$ injection control and flue gas flow distribution across the precipitator are important to reduce particulate emissions. For coal fired units, 2–10 ppm $NH_3$ level is normally used in flue gas to condition the flue gas and particulate while avoiding excessive $NH_3$ build up in the collected fly ash for disposal. This ammonia injection results in greater particulate removal as well as some $SO_x$ desulfurization due to reaction with $SO_3$. For oil fired units, $NH_3$ reacts with $SO_3$ to form particulates and prevent acid mist at stack exit.

Electrostatic precipitators are normally located downstream of the air heater and the SCR (selective catalyst reduction) unit. This unit is used to remove NOx and uses ammonia in conjunction with a catalyst bed to effect the $NO_x$ reduction.

The SCR catalyst is typically plate type or honeycomb type developed and marketed commercially. The main reaction in the $DeNO_x$ process is:

$$NO + \tfrac{1}{4}O_2 + NH_3 \rightarrow N_2 + \tfrac{3}{2}H_2O.$$

To remove $SO_2$ generated in the combustion process, the flue gas is treated in plate/spray type absorbers known as Flue Gas Desulfurization (FGD) units to reduce $SO_2$ to the required level (80–95% reduction). Such units use lime and sometimes ammonia spray solutions to affect the desulfurization.

Currently, the Walther Process employs ammonia FGD followed by SCR $DeNO_x$ removal. In the prior art Walther process the SCR is located downstream from the FGD scrubber.

The sequence of $NO_x$ and $SO_x$ removal and the use of electrostatic precipitation varies in known processes. Thus it will be seen that although it is known in the prior art to use independently ammonia injection in SCR, electrostatic precipitation and FGD technology, to date there has been no systems that utilize all three systems sequentially integrated together in a particular order and arrangement with ammonia supplied to all three systems by a single controlled ammonia source.

SUMMARY OF THE INVENTION

The present invention solves the problems associated with the prior art emission control systems as well as others by providing an emission control system utilizing ammonia injected SCR, electrostatic precipitation and FGD with the ammonia being injected at a controlled rate from a single ammonia supply source.

To accomplish this, the emission control system injects $NH_3$ controllably mixed with air or flue gas to the SCR unit which is located at the boiler flue gas exhaust. The amount of ammonia passing through the catalyst bed of the SCR unit depends upon $NO_x$ concentration in the flue gas and the $NO_x$ reduction of the SCR catalyst bed. Typically, $NH_3$ slip (the excess $NH_3$ in the $NO_x$ reduction process) is controlled at 2–10 ppm without adversely affecting the downstream equipment. The SCR temperature range is maintained at 550°–750° F.

The flue gas from the SCR is passed through the air heater to an electrostatic precipitator. Here, additional $NH_3$ with air as required is injected into flue gas before the precipitator to provide gas conditioning at about 300° F. for the enhanced reduction of the flyash emission. Additionally $SO_3$ formed from the SCR system further improves the performance of marginally sized precipitators by gas conditioning.

The flue gas from the precipitator is routed to the FGD unit where $NH_3$ is injected in a liquid state after being mixed with recirculating liquid from the unit as a quench stream for the flue gas. The recirculating mixture quenches the precipitator outlet from about 300° F. temperature at the entrance to the FGD unit to about 130° F. Because of the sudden cooling, most aerosols generated from the $SO_3$ and HCL reaction will condense at the inlet to the FGD assembly. Additional ammonia is injected as required.

In view of the foregoing it will be seen that one aspect of the present invention is to provide an integrated emission control system utilizing ammonia injected for $NO_x$ reduction, particulate control, and $SO_2$ removal.

Another aspect of the present invention is to provide a single controlled ammonia source for the above emission control system.

These and other aspects of the present invention will be more fully understood upon a review of the following description of the preferred embodiment when considered in conjunction with the accompanying drawing.

BRIEF DESCRIPTION OF THE DRAWING

The drawing is a schematic of the emission control system of the present invention.

DESCRIPTION OF THE PREFERRED EMBODIMENT

Figure 1:
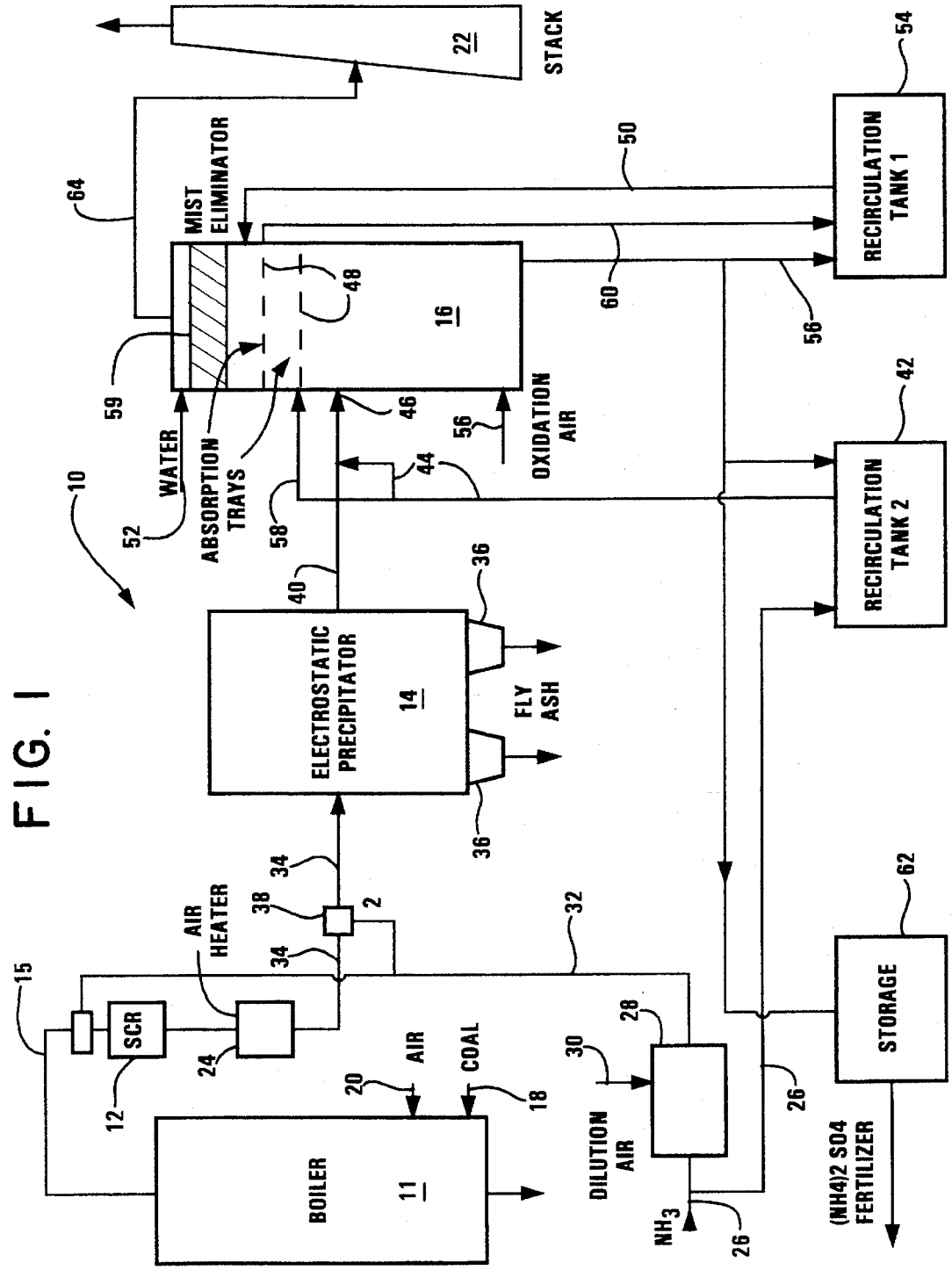

Referring now to the drawing where the showing is of a preferred embodiment of the emission control system it will be understood that the invention is not limited thereto. The drawing shows an emission control system 10 comprising a selective catalyst reactor (SCR) 12, an electrostatic precipitator 14, and a flue gas desulfurization (FGD) unit 16 series connected to a flue exhaust 15 of a boiler 17. The boiler 17 generates heat by the combustion of fossil fuel diluted with air and supplied to the boiler 17 along lines 18 and 20 respectively. The combustion by-products are exhausted from the flue 15 and include flyash particulates along with $NO_x$ and $SO_x$ pollutants all of which must be substantially eliminated by the emission control system 10 prior to exhausting the flue gases from a stack 22 for dispersal to the surrounding environment.

The SCR system 12 is mounted in the flue exhaust 15 of the boiler 17 upstream of an air heater 24 and comprises a catalyst bed (not shown) having an ammonia injection grid (not shown) upstream thereof to evenly spray an ammonia mixture into the flue gases to be mixed therewith prior to passing the mixture through the catalyst bed of the SCR. The $NO_x$ and the ammonia react in the catalyst bed to form nitrogen $N_2$ and water. The catalyst also oxidizes a small amount of the $SO_2$ of the $SO_x$ to $SO_3$. Such catalyst beds are known and are commercially available.

The aqueous ammonia is supplied to the SCR from a storage tank (not shown) along line 26 to a ratio controller 28 where the aqueous ammonia flow is controlled to meet $NO_x$ reduction requirements. The ammonia is vaporized and diluted with dilution medium supplied along line 30 according to a predetermined dilution ratio. The dilution medium may be flue gas from the boiler 15 or hot air to vaporize the ammonia. The mixture of ammonia and dilution medium is supplied to the injection grid of the SCR along line 32 to thus substantially eliminate the $NO_x$ from the flue exhaust gases and exhaust them through the air heater 24 along line 34 to the electrostatic precipitator 14.

The electrostatic precipitator 14 is of known construction and charges the flyash particles passing into it along line 34 and collects these particles on collection surfaces therein. Periodic rapping of collection plates causes the flyash deposited thereon to be dropped into hoppers 36 from which the flyash is collected for disposal.

It is known that the performance of such precipitators may be enhanced by treating the gas input with sulfur trioxide and ammonia. Such gas treatment improves the resistivity and cohesiveness of the particles and improves the effectiveness of the precipitator 14. It will be recalled that the output of the catalytic bed produced some $SO_3$. Ammonia is added to the precipitator inlet along line 34 by a controller 38 connected to line 2 as well as line 32 containing diluted ammonia to mix the ammonia with the exhaust of the SCR to provide a 2–10 ppm ammonia level in the electrostatic precipitator 14. The flue gas at the outlet of the precipitator 14 is now substantially free of $NO_x$ and particulates such as flyash and this flue gas is supplied along line 40 to the flue gas desulfurization unit FGD 16 for $SO_x$ removal.

The FGD unit 16 is a plate/spray type absorber wherein $SO_2$ is reduced by 80%–95% using an ammonia spray solution. Ammonia supplied to the SCR is also supplied along line 26 into a recirculation tank 42 from which the ammonia mixture is sprayed into the inlet 46 of the FGD unit 16 from line 44. This injection of solution containing ammonia quenches the flue gas coming from the precipitator along line 40 from about 300° F. to approximately 130° F. This sudden cooling causes large amounts of aerosols generated from $SO_3$ and HCL reactions to condense at the inlet 46 below the absorption trays 48. Additional ammonia is supplied into the trays 48 along line 50. The quenched flue gas passes through the trays 48 where each tray is used to scrub the $SO_2$ from flue gas in accordance to vapor-liquid equilibrium relationship. Because the $NH_3$ reagent is volatile, liquid concentration gradients can be more easily controlled in the trays than spray alone absorption systems. Fine mist carryover is reduced in the tray tower in the absence of large numbers of spray droplets. Fresh water is introduced at a mist eliminator 59 from line 52 as a make up to the scrubber system and keeps the mist eliminator clean. The mixture of ammonia, water, and reaction products are collected at the bottom of the FGD unit and are discharged to a recirculation tank 54 along line 56 from which tank this mixture is recirculated in the FGD unit along lines 50, 58 and 60. The excess liquid mixture is also supplied to recirculation tank 42 for supplying the quenching solution containing ammonia to the FGD unit as well as storage tank 62. Air is sparged at the bottom of the FGD unit 16 to oxidize ammonium bisulfite-sulfite to ammonia sulfate. This $(NH_4)_2SO_4$ solution is further processed from the storage tank 62 to obtain solid granulated product and is sold as fertilizer.

The flue gas discharged from line 40 is processed through the FGD unit 16 as was described above resulting in a flue gas flow from line 64 to the stack 22 which is substantially free of $NO_x$ and $SO_x$ and particulate.

It will be understood that certain obvious modifications, alternate embodiments, and additions have been deleted herein for the sake of conciseness and readability but are fully within the scope of the following claims. As an example, similar applications of $NH_3$ reagent to exhaust gas treatment may also include industrial areas such as smelter plant, sulfuric acid plant, waste processing units (municipal waste incinerators) and fluidized bed combustion system. Also, different combinations of ammonia injection process based on site specific conditions may be used in two locations (SCR with ESP, ESP with scrubber, or SCR with scrubber).

What is claimed is:

1. A flue gas treatment system for a boiler, comprising:
   an ammonia injection selective catalyst reduction unit connected to remove $NO_x$ from the flue exhaust gases of the boiler, said ammonia injection selective catalyst reduction unit being located at the boiler flue gas exhaust;
   an electrostatic precipitator positioned downstream from said ammonia injection selective catalyst reduction unit, said electrostatic precipitator having a predetermined amount of ammonia injected therein to enhance removal of particles from the flue exhaust gases of the boiler; and
   a flue gas desulfurization unit positioned downstream from said electrostatic precipitator, said flue gas desulfurization unit having ammonia solution injected therein and connected to remove $SO_x$ generated from the boiler, said ammonia injection selective catalyst reduction unit, said electrostatic precipitator, and said flue gas desulfurization unit being sequentially integrated in the flue gas treatment system with the ammonia being supplied from a single source which is connected to said ammonia injection selective catalyst reaction unit, said electrostatic precipitator, and said flue gas desulfurization unit.

2. A flue gas treatment system as set forth in claim 1 further comprising controller means for maintaining the ammonia injected into said precipitator sufficient to maintain a 2 to 10 ppm ammonia in the flue gas.

3. A flue gas treatment system as set forth in claim 1 further comprising an ammonia injection quench line at the inlet of the flue gas to said flue gas desulfurization unit to quench the temperature of the flue gas to approximately 130° F.

4. A flue gas treatment system as set forth in claim 3 wherein said flue gas desulfurization unit includes an absorption tray tower and mist eliminator downstream of said quench line.

5. A flue gas treatment system as set forth in claim 4 further comprising a second ammonia injection line for injecting ammonia into said absorption tray tower.

6. A flue gas treatment system as set forth in claim 5 further comprising a sparge air line at the bottom of said flue gas desulfurization unit for oxidizing ammonium bisulfite-sulfite to sulfate.

7. A flue gas treatment system as set forth in claim 3 wherein said selective catalyst reduction unit is connected to the flue of the boiler upstream of an air heater.

8. A flue gas treatment system as set forth in claim 7 wherein said electrostatic precipitator is connected to the exhaust of said air heater.

9. A flue gas treatment system as set forth in claim 8 wherein said flue gas desulfurization unit is connected to the exhaust of said precipitator.

10. A flue gas treatment system as set forth in claim 1 wherein the boiler is a fossil fuel fired boiler.

11. A method of removing $NO_x$, $SO_x$ and particulates from the exhaust flue gases of a boiler, comprising the steps of;
    positioning sequentially in a flue gas treatment system a selective catalyst reduction $NO_x$ removal unit at the boiler flue gas exhaust, an electrostatic precipitator unit downstream therefrom and a flue gas desulfurization unit downstream therefrom;
    connecting ammonia from a single source to the selective catalyst reduction $NO_x$ removal unit, the electrostatic precipitator unit, and the flue gas desuifurization unit;
    injecting an ammonia and dilution air mixture into the selective catalyst reduction $NO_x$ removal unit;
    simultaneously injecting a predetermined amount of ammonia into the electrostatic precipitator unit; and
    simultaneously injecting an ammonia liquid solution into the flue gas desulfurization unit.

12. A method of treating the exhaust flue gases as set forth in claim 11 wherein said ammonia solution is injected into the flue gas desulfurization unit at two distinct locations at inlet quench and above trays.

13. A method of treating the exhaust flue gases as set forth in claim 11 wherein sufficient ammonia is injected into the electrostatic precipitator to maintain a ratio of 2–10 ppm of ammonia to flue gases.

14. A method of treating the exhaust flue gases as set forth in claim 11 wherein sufficient ammonia liquid solution is injected into the flue gas desulfurization unit to quench the temperature therein to approximately 130° F. and reduce $SO_2$ from the flue gas.

* * * * *